Figure 1:
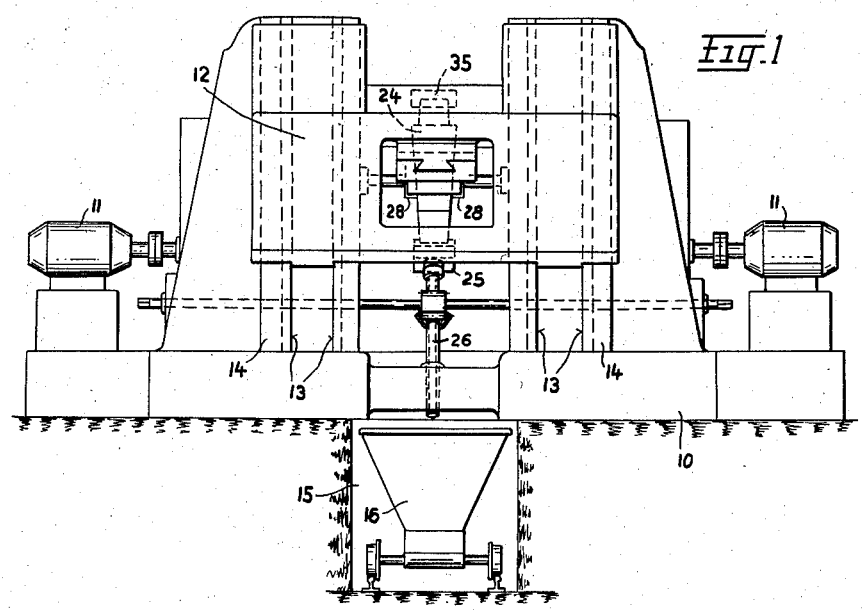

INVENTORS,
HERBERT SEDLACZEK,
OSKAR WALDRICH

INVENTORS,
HERBERT SEDLACZEK
OSKAR WALDRICH

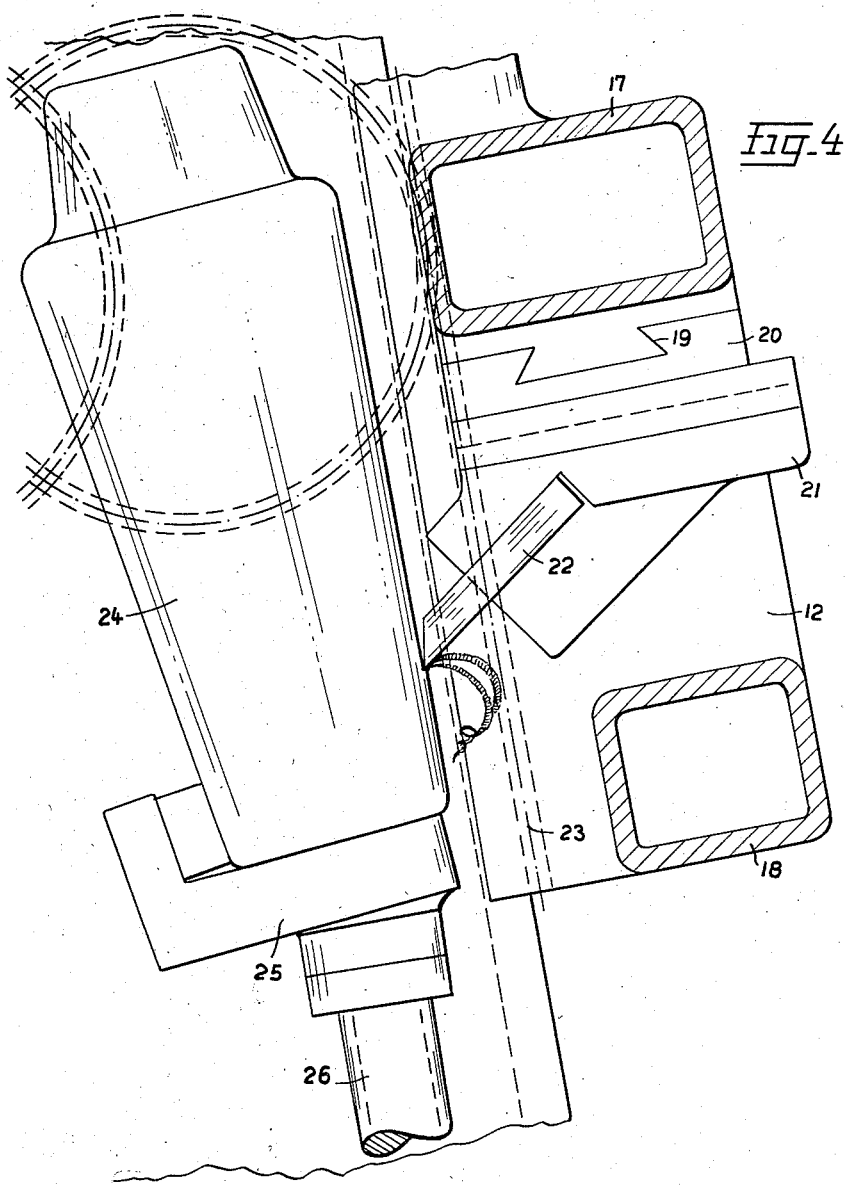

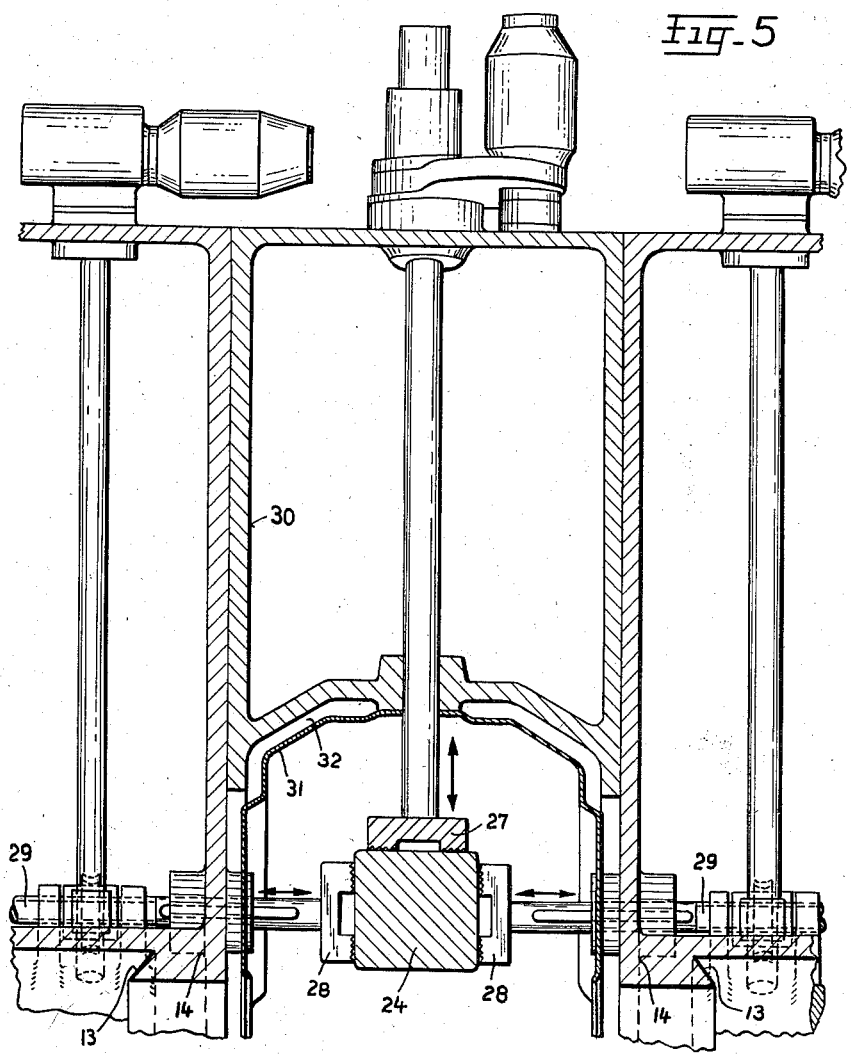

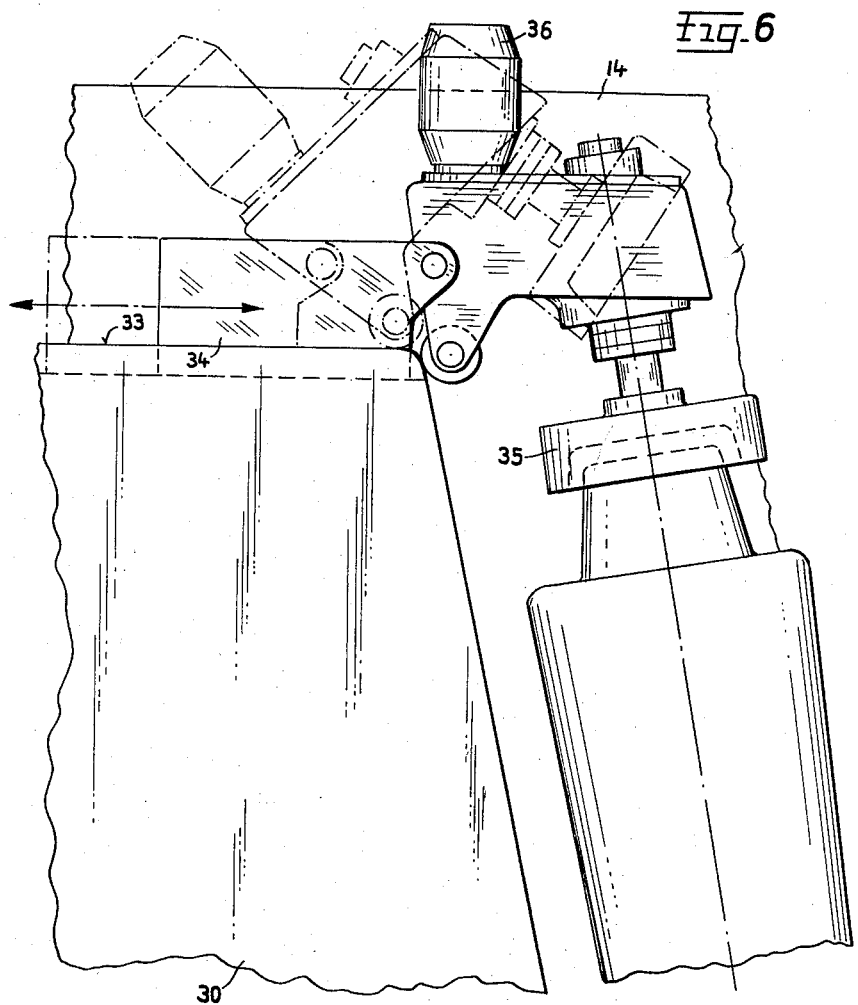

United States Patent Office 2,869,432
Patented Jan. 20, 1959

2,869,432
HOT MACHINING OF METAL INGOTS

Herbert Sedlaczek, Aachen, and Oskar Waldrich, Siegen, Westphalia, Germany

Application June 28, 1954, Serial No. 439,724

Claims priority, application Germany July 4, 1953

6 Claims. (Cl. 90—43)

It has already been proposed to treat metal ingots and in particular steel ingots, especially those of great weight, by a procedure according to which these ingots after casting and stripping and treatment in the soaking pit, as has long been usual, are machined in hot condition in order to free them of their cast skin. After this machining the ingots are delivered to the cogging mill in order to be rolled into blooms, slabs or billets which are thereafter rolled again. This new process which was considered to be an important forward step has, however, some disadvantages as follows:

The milling operation is badly adapted for inclusion in the course of the whole process because as experience has shown the milling of the hot ingots takes about 460 seconds, whereas following this the ingot can be dealt with in the cogging mill in about 320 seconds. This working time of 320 seconds corresponds to the conditions prevailing at the time, that is, primarily to the temperature necessary for satisfactory rolling. But as according to this prior proposal the milling operation is effected following the heating of the ingot in the soaking pit, a fall in temperature takes place during milling, which even when this step is carried out as rapidly as possible and all precautions are taken, amounts to about 50°. Through this temperature drop the work of rolling is made more difficult and slower so that the usual time of 320 seconds is increased by the prior proposal to 360 seconds. The difference between the operating time in the milling machine and in the cogging mill thus becomes somewhat less—even though by only a small amount—nevertheless the fact remains that the whole plant with the exception of the milling machine is not fully loaded and thus has a reduced economic efficiency.

A further disadvantage of the proposed process is that with hold-ups and spreading of production the ingots coming from the soaking pit and milled are in some cases taken to an annealing furnace and cooled and then have to be taken into storage. This has the disadvantage, however, that the already machined ingots then have to be put into the soaking pit again when taken from the store for further working and have to be heated here. They are obviously not milled again as this would mean a double load on the plant, so that two different qualities are obtained in the final product according to whether they have been worked in a continuous process or whether they have been taken from store, the differences in quality being noticeable.

According to the invention it is proposed to interpose the hot machining not between the soaking pit and the cogging mill but between the casting of the ingots and the soaking pit, that is, to effect the hot machining following the stripping of the ingots from the moulds.

From this results a number of important advantages.

The ingots are put into the soaking pit already machined and are taken direct from the pit to the cogging mill so that the necessary temperature for normal rolling can always be maintained and thus the working time of about 320 seconds not be exceeded.

A further advantage consists in that now high quality special steel ingots which as is known have very high temperature sensitivity can now be machined without harm because owing to the very rapid machining cooling between stripping and the soaking pit is of less amount than is the case in the prior proposed process between the soaking pit and the cogging mill, and because this cooling is, in any case, compensated in the soaking pit.

Further storing of the ingots does not occasion any disadvantages because the ingots do not as in the previously proposed process have to be taken after milling to the annealing furnace and from this back again to a preceding working stage, namely, the soaking pit but because after the hot machining following stripping in accordance with the invention the ingots are taken to the annealing furnace, from here to store and from store to the next succeeding stage, namely, the soaking pit. For this reason no noticeable variations in the quality of the product arise so that the products show the necessary uniformity independently of whether the ingots are taken from store or are directly worked, so far as they are treated according to the invention.

As regards the advantage of the particular point at which the hot machining is introduced into the temperature cycle by the invention, it should also be mentioned that the above specified temperature sensitive high class steels cannot withstand a temperature drop of more than 100° C. after removal from the soaking pit. These varieties of steel cannot therefore be given the previously proposed milling succeeding the soaking pit because they would then reach the cogging mill at too low a temperature so that the rolling process would have to be interrupted and the ingot re-heated. But if this were done all the advantages of the milling operation following treatment in the soaking pit would be completely destroyed.

Finally, mention should be made of the advantages which are obtained as regards the machining operation and the machine tool used. Whereas the hot machining of the previously proposed process is effected at a very high temperature, namely, that at removal from the soaking pit, the machining according to the invention following stripping takes place at a temperature which is substantially lower, namely, by about 200° C. While therefore, in the previously proposed process the use of carbide tools was not possible on account of the high temperature, in the process according to the invention carbide tools can be used whereby the machining time is further reduced.

Accordingly, the present invention consists in the first place in subjecting the ingots between stripping and entry into the soaking pit to a chip removing hot machining on their surfaces.

From the production point of view no hold-up is caused by the hot machinery, and in particular, hot planing, because a 2.5 ton four sided ingot can for example after stripping from the mould be planed on all four sides including setting the ingot up in the machine and removing it in at most six minutes. An octagonal ingot could be completely machined in about ten minutes. Similar conditions also apply to slab forms. Assuming that an electric steel furnace charge on the average weighs 20 tons, the number of ingots with an ingot weight of 2.5 tons would be eight per charge. The whole charge could therefore be planed in about ¾ hour. The working operations would then take place as follows.

After the crane has stripped the first ingot from the mould it carries the ingot to the planing machine which would be set up between the steel making plant and the soaking pits of the cogging mill. The crane then returns to the moulds and strips the second ingot and so on. The time between the setting of the first ingot on the planing machine until the stripping of the second usually amounts to about 3 minutes. As the hot planing takes 6 to 10 minutes the crane would have an interval of about 3 minutes. Either the interval can be accepted as part of the cost or the crane used in the interval for other work connected with the casting of the steel, or one crane can be used for each two planing machines which are alternately fed by the one stripper crane. When it is borne in mind that an ingot lathe can at the utmost machine cool 1 ton per hour, while a hot planing machine deals with at least 20 tons per hour, from this alone the advantage of hot planing over cold machining can be seen without taking account of the other disadvantages of the previous process such as slow cooling of the ingots in the foundry, annealing and so forth. Apart from the fact that to deal with the same quantities as are possible in the planing process according to the invention by a single planing machine, at least 20 ingot lathes and additional annealing plant would be necessary, these 20 ingot lathes and the annealing furnaces require a correspondingly large space, normally indeed, a completely separate hall. The space occupied by a hot planing machine is, however, not much greater than that of a single ingot lathe, and it can be set up without special provision in any steelworks or soaking pit installation.

The objections which have been raised against hot machining are met by the advantageous arrangement of the ingot in the planing machine according to the invention. According to the invention the ingot is planed while standing upright or inclined at an angle of not less than 60° to the horizontal. The holding and centering of the ingot are effected by engagement with its longitudinal surfaces so that owing to the low specific stresses deformation of the ingot through the holding jaws cannot occur. Further this vertical arrangement avoids the risk of unnatural pipe formation should the ingot still not be completely solidified in the centre. If the ingot were set horizontally the residual fluid material gradually solidifying would produce a long thread-like cavity which would not be later welded together and would later show in all the rolled billets; in other words, the material would be rendered unfit for further working. If the ingot is planed in the vertical position it can continue pipe formation in the usual way, so that the piping would be limited to the sinking or dead head and the rest of the ingot would remain solid. Apart from this, during vertical planing the surface can be very satisfactorily observed because the cuttings move downwardly and leave the plane surface freely in view.

Further, owing to the short time of planing, the temperature loss of the ingot is so small that it reaches the soaking pit hardly any cooler than in the usual procedure without hot machining of the ingot.

Weighing of the ingot can be effected before or after planing and, in any case, before it is put into the soaking pit. By weighing the cuttings and adding or subtracting, the weight of the machine ingot and the weight of the raw ingot can at once be calculated.

An example of apparatus according to the invention and by which the process of the invention can be practised is illustrated in the accompanying drawings.

Figure 2:
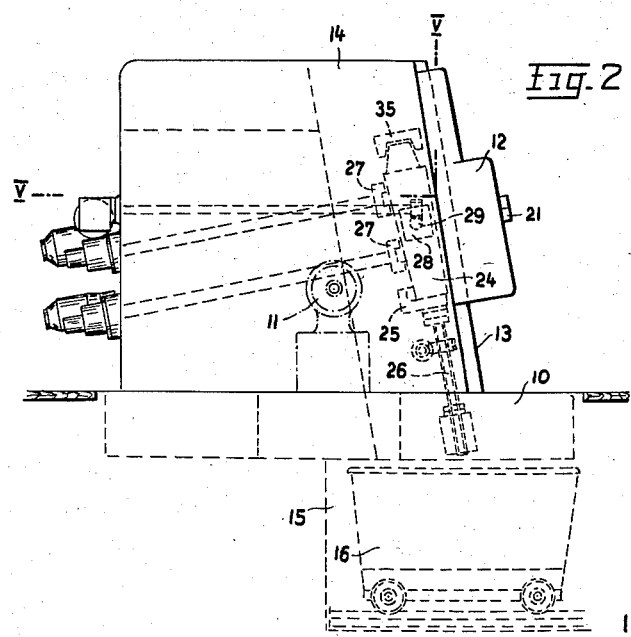
Figure 3:
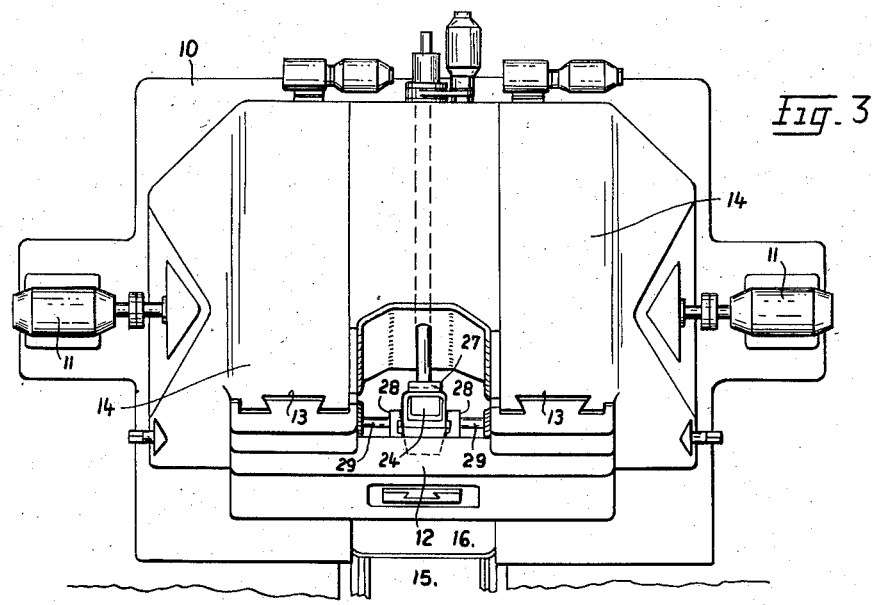
Figure 7:
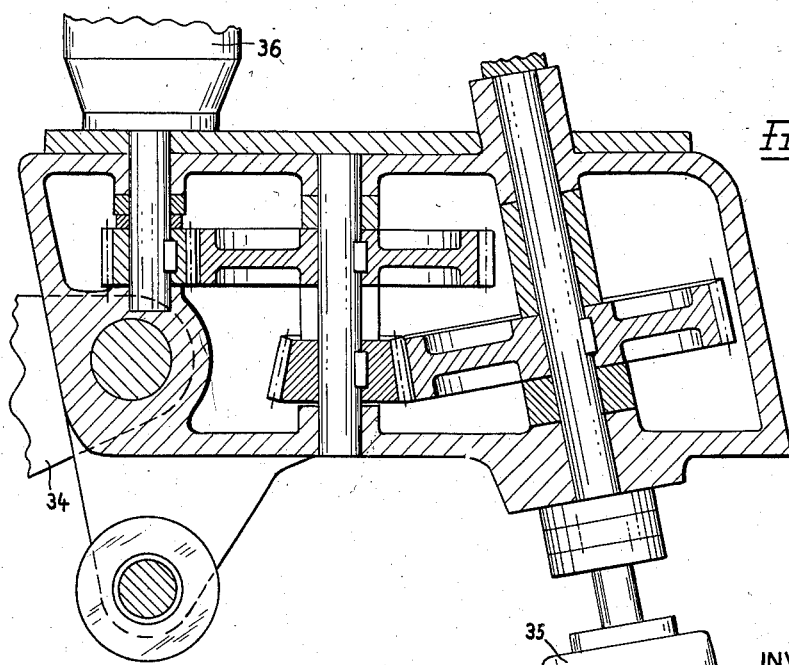

Fig. 1 is a front view,
Fig. 2 is a side view,
Fig. 3 is a plan view of a hot planing machine according to the invention,
Fig. 4 is a detail view in section through the cross beam of the machine, on a larger scale,
Fig. 5 is a section on the line V—V in Fig. 2,
Fig. 6 is a side view of the rotating head, and
Fig. 7 is a longitudinal section though the rotating head on a larger scale.

On a strong baseplate 10 carrying all the parts are mounted two similar electric motors 11 which serve for imparting the drive to a planing cross beam 12 which is guided to move along longitudinal guides 13 on columns 14.

Beneath the baseplate 10 in the centre is a service gangway 15 along which trucks 16 can be run to receive the cuttings.

The guides 13 on the columns 14 are in side view inclined at an angle of 85° to the horizontal, see Fig. 2.

As Fig. 4 shows the cross beam consists of an upper part 17 and a lower part 18 which are parts of a unitary casting which constitutes a rigid frame. On the underside of the upper part 17 is a guide 19 for a cross carriage 20 and on this a tool slide 21 is provided in which a tool 22 is clamped. Though only one tool is visible in Fig. 4 it is possible to use a plurality of tools in staggered formation which simultaneously cut along lines side by side. The cross beam 12 is provided with toothed racks 23.

The ingot 24 to be machined is first set on a supporting plate 25 which corresponding with the length of the ingot can be adjusted in height through a screw spindle 26. As Figs. 2 and 3 show the ingot is held by two adjustable back supports 27, and has the surface to be machined brought into a position corresponding to the 85° inclination of the guides for the cross beam and allowing for the depth of cut. It is then held on both sides by clamping jaws 28 which are moved forward by the aid of corresponding screwed spindles 29, see Fig. 3.

These details and the means for operating them are better visible in Fig. 5 which also shows the two columns 14 and a central column 30 which unites them into a unitary structure with a box cross section. In order to hinder transmission of heat by radiation from the ingot to the columns and the parts mounted thereon, a shield 31 of sheet metal is provided between the ingot and the surfaces of the columns facing the ingot, the shield being set at such a distance from these surfaces that an intermediate space 32 is left through which cooling air can be passed.

Fig. 6 shows the upper end of one of the columns 14 and of the central column 30, the upper surface 33 of which serves as a rolling track for a support 34 of a rotating head 35, having a driving motor 36, the rotating head 35 when in position 1 holds the ingot and after termination of the machining of one surface rotates it through an angle to bring the next surface to be machined into position, while in position 2 the rotating head has been swung back and lifted off the ingot so that the ingot can now be removed by a crane. Fig. 7 is a section through the support 34 of the rotating head shown in Fig. 6 and shows the gearing between the motor 36 and the rotating head.

It will be seen, therefore, that weight supporting element 25 and adjustable supports 27 and clamping jaws 28 form a vertical cradle into which a freshly stripped ingot can be deposited by an overhead crane. The guides 13 are at such an angle to the vertical that they are parallel to an exposed face of an ingot leaning against supports 27 so the ingot is held in the proper position for slicing off the outer surface by moving cross beam 12 carrying a cutting tool 22 downward the length of the ingot. It will be noted, further, that the adjustable supports 27 cover a considerable surface of the ingot so that there will be no deformation of the hot, still soft ingot during machining.

To machine the other sides of the ingot the upper end of the ingot is drivingly held in a cup-shaped clutch-like element 35 so that after machining one face the elements 27 and 28 are withdrawn and the ingot rotated as required by rotating element 35 by motor 36. The supports 27 and 28 are then again advanced and the ingot, securely held in the cradle of the machine, is again machined.

The apparatus can be modified in various ways, thus the supporting plate 25 can be rotatable and be used for rotating the ingot or it may be geared to the rotating head 35 so that both are used to rotate the ingot. Again the supporting parts 25, 27, 28 could be guided on guides on the column 30. Also, automatic radial feed could be provided for the tool for copy planing of ingots with curved profile.

What we claim is:

1. A machine for planing a hot ingot comprising a pair of supporting columns, a guide on each column at an angle not exceeding 30° from the vertical, means adjustable on the said columns for supporting an ingot with one face parallel to said guides and its dead head uppermost, a cross beam slidably mounted on said guides, a guide on said cross beam parallel with said one face of an ingot when carried by said supporting means, at least one toolholder movable on said last mentioned guide, and means for reciprocating said cross beam on its guides, whereby a tool mounted in said tool holder may be moved along said face of an ingot supported in the machine.

2. A machine as set forth in claim 1 wherein said ingot supporting means includes supporting members adjustable with respect to the side of the ingot opposite that upon which the tool acts.

3. A machine as set forth in claim 1 wherein said supporting means includes a rotatable clutch-like head for the dead head of the ingot.

4. A machine as set forth in claim 1 wherein said supporting means includes a member for supporting one end of the ingot and means for rotating said supporting member.

5. In a machine for planing ingots, a substantially vertical cradle for receiving an ingot, said cradle having a bottom element to support the major portion of the weight of an ingot, in substantially upright position, substantially vertical parallel guide ways along each side of said cradle, the angularity of said cradle and of said guide ways with the vertical being such that an ingot resting in said cradle presents a face in a plane parallel to the plane of said guide ways, and a cutting-tool-carrying cross beam slidably mounted on said guide ways, whereby the outer surface of a hot ingot placed in said cradle can be machined by downward movement of said cross beam on said guide ways.

6. A machine for planing a hot ingot having a plurality of relatively flat longitudinal surfaces comprising support means for an ingot with one of said longitudinal surfaces near the vertical and its dead head uppermost, a pair of columns, a guide on each column substantially parallel with said one of its longitudinal surfaces of the ingot when it is supported by said supporting means, a cross beam movable on said guides, a tool holder carried on said cross beam, means for reciprocating said cross beam along said guides, adjustable means to engage at least the longitudinal side of a hot ingot opposite said one of its longitudinal surfaces when resting on said support means to prevent lateral movement of said ingot, and means for manipulating a hot ingot on said support to present successive faces for the planing operation, said manipulating means comprising a rotatable clutch-like element to engage the dead head of the ingot.

References Cited in the file of this patent

UNITED STATES PATENTS

| 800,667 | McMillen | Oct. 3, 1905 |
| 1,038,271 | Benjamin | Sept. 10, 1912 |
| 1,795,519 | Sheldon | Mar. 10, 1931 |
| 1,925,499 | Reis | Sept. 5, 1933 |
| 2,154,326 | Dorin | Apr. 11, 1939 |
| 2,236,829 | Musil et al. | Apr. 1, 1941 |
| 2,251,885 | Indge | Aug. 5, 1941 |

FOREIGN PATENTS

| 906,880 | Germany | Mar. 18, 1954 |